United States Patent
Lee

(10) Patent No.: US 11,465,588 B2
(45) Date of Patent: Oct. 11, 2022

(54) LINEAR RECIPROCATING WIPER SYSTEM PROVIDED WITH WIPER PARKING STRUCTURE

(71) Applicant: DY AUTO Corporation, Asan-si (KR)

(72) Inventor: Jeong Goo Lee, Asan-si (KR)

(73) Assignee: DY AUTO Corporation, Asan-si (KR)

( * ) Notice: Subject to any disclaimer, the term of this patent is extended or adjusted under 35 U.S.C. 154(b) by 0 days.

(21) Appl. No.: 17/337,851

(22) Filed: Jun. 3, 2021

(65) Prior Publication Data
US 2022/0126789 A1    Apr. 28, 2022

(30) Foreign Application Priority Data
Oct. 23, 2020   (KR) ........................ 10-2020-0138589

(51) Int. Cl.
| | |
|---|---|
| *B60S 1/34* | (2006.01) |
| *B60S 1/18* | (2006.01) |
| *B60S 1/22* | (2006.01) |
| *B60S 1/20* | (2006.01) |
| *B60S 1/44* | (2006.01) |

(52) U.S. Cl.
CPC ............ *B60S 1/3404* (2013.01); *B60S 1/185* (2013.01); *B60S 1/20* (2013.01); *B60S 1/22* (2013.01); *B60S 1/3409* (2013.01); *B60S 1/44* (2013.01)

(58) Field of Classification Search
CPC .... B60S 1/3404; B60S 1/3418; B60S 1/0469; B60S 1/0452; B60S 1/0455; B60S 1/0458; B60S 1/06; B60S 1/20; B60S 1/22; B60S 1/185; B60S 1/3409; B60S 1/44

USPC .............. 15/250.24, 250.21, 250.29, 250.28, 15/250.16
See application file for complete search history.

(56) References Cited

U.S. PATENT DOCUMENTS 1,655,670 A * 1/1928 Waters .................. B60S 1/3404
                                                    15/250.16
1,661,388 A * 3/1928 Sather ............................. 92/138
(Continued)

FOREIGN PATENT DOCUMENTS

| | | |
|---|---|---|
| JP | H05139251 | 6/1993 |
| JP | 2000006766 | 1/2000 |

(Continued)

OTHER PUBLICATIONS

Notice of Allowance for Korean Application No. 10-2020-0138589, dated Mar. 8, 2021.

*Primary Examiner* — Gary K. Graham
(74) *Attorney, Agent, or Firm* — Klarquist Sparkman, LLP

(57) ABSTRACT

A reciprocating wiper system according to the present invention may include a guide rail; a carrier unit coupled to be slidable in the guide rail and installed to reciprocate in a longitudinal direction of the guide rail; a cam member installed to be rotatable on the carrier unit; a wiper arm coupled to the cam member to move integrally with the cam member and to which a blade is coupled; a first pressing member for aligning the wiper arm in a direction perpendicular to the guide rail by rotating the cam member while the carrier unit is moving in a forward direction along the guide rail; and a second pressing member for aligning the wiper arm in a direction parallel to the guide rail by rotating the cam member while the carrier unit is moving in a reverse direction along the guide rail.

4 Claims, 10 Drawing Sheets

(56) References Cited

U.S. PATENT DOCUMENTS

| | | | | |
|---|---|---|---|---|
| 3,078,494 A | * | 2/1963 | Price | B60S 1/18 |
| | | | | 15/250.17 |
| 3,649,989 A | * | 3/1972 | Parker | B60S 1/185 |
| | | | | 15/250.16 |
| 3,686,706 A | * | 8/1972 | Finley | B60S 1/3404 |
| | | | | 15/250.16 |
| 6,163,921 A | * | 12/2000 | Takayama | B60S 1/20 |
| | | | | 15/250.16 |
| 10,960,852 B2 | | 3/2021 | Gorce | |

FOREIGN PATENT DOCUMENTS

| | | |
|---|---|---|
| JP | 2000085544 | 3/2000 |
| KR | 101027919 | 4/2011 |
| KR | 20190005776 | 1/2019 |

* cited by examiner

LINEAR RECIPROCATING WIPER SYSTEM PROVIDED WITH WIPER PARKING STRUCTURE

CROSS-REFERENCE TO RELATED APPLICATION

This application is based on and claims priority under 35 U.S.C. § 119 to Korean Patent Application No. § 119 to Korean Patent Application No. 10-2020-0138589, filed on Oct. 23, 2020, in the Korean Intellectual Property Office, the disclosure of which is incorporated by reference herein in its entirety.

BACKGROUND

1. Field

The present invention relates to a wiper system for removing foreign substances from the glass windshield of a vehicle or a ship, and particularly, to a wiper system that moves linearly and reciprocally.

2. Description of the Related Art

In general, a window wiper system employed in a vehicle removes foreign substances from the surface of a windshield by a blade installed on a wiper arm that reciprocates and rotates in a certain angular range by a pivot axis rotated by a motor. In a hatchback style vehicle or a sports utility vehicle (SUV), which is a vehicle type, a wiper system is also installed on the rear window depending on the aerodynamic characteristics. On the other hand, when the windshield of the steering room is significantly larger than that of a vehicle, like in the case of a ship, a linear reciprocating wiper system may be employed in which the wiper arm is linearly reciprocated by means such as a belt to remove foreign substances from a glass surface.

However, in recent years, as the design style of vehicles has changed, the tendency to reduce the height of the rear window has been increasing. According to the law, the wiper must be installed to wipe a certain percentage or more of the total area of the window. However, as the height of the rear window is reduced, it is difficult to secure a wipe area of the window prescribed by law with a generally used rotary wiper system. In order to solve this problem, it is necessary to introduce a linear reciprocating wiper system for use in vehicles. However, because the linear reciprocating wiper system remains exposed to one side of the rear window (glass) while the wiper blade is stationary, there is a problem in that the driver's rear view is obstructed and the appearance thereof is unaesthetic. In addition, because the wiper parking position of the conventional linear reciprocating wiper system is not only exposed to the glass, but also the front end of the wiper blade is configured to face upward, there is a problem in that durability is not secured, and thus, the wiper arm may be likely unexpectedly damaged by equipment such as an automatic washer.

PRIOR ART DOCUMENTS

Patent Documents

KR 10-2019-0005776 A (2019.01.16)

SUMMARY

An object of the present invention is to provide a linear reciprocating wiper system having a parking structure with improved durability without obstructing the driver's view when the wiper is not in operation, by improving the linear reciprocating wiper system.

Additional aspects will be set forth in part in the description which follows and, in part, will be apparent from the description, or may be learned by practice of the presented embodiments of the disclosure.

In order to achieve the object, the linear reciprocating wiper system provided with a parking structure according to the present invention may include: a guide rail;

a carrier unit coupled to be slidable in the guide rail and installed to reciprocate in a longitudinal direction of the guide rail;

a cam member installed to be rotatable on the carrier unit and provided with a pivot shaft to which a wiper arm is coupled;

a wiper arm coupled to the cam member to move integrally with the cam member and to which a blade is coupled;

a first pressing member for aligning the wiper arm in a direction perpendicular to the guide rail by rotating the cam member while the carrier unit is moving in a forward direction along the guide rail; and a second pressing member for aligning the wiper arm in a direction parallel to the guide rail by rotating the cam member while the carrier unit is moving in a reverse direction along the guide rail.

The linear reciprocating wiper system provided with a parking structure may include: a driving wheel installed at one end of the guide rail and rotated by a driving motor;

a driven wheel installed at the other end of the guide rail; and a power transmission member connected to the drive wheel and the driven wheel and fixed to the carrier unit.

It is preferable that the first pressing member is fixed to the guide rail, and the second pressing member is fixed to a driving wheel cover fixed to the guide rail.

It is preferable that the carrier unit includes a plurality of rollers, and the plurality of rollers are configured to move along a roller guide formed on both side walls of the guide rail.

The carrier unit is provided with a rotation limiting stopper for limiting a rotation range of the cam member.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
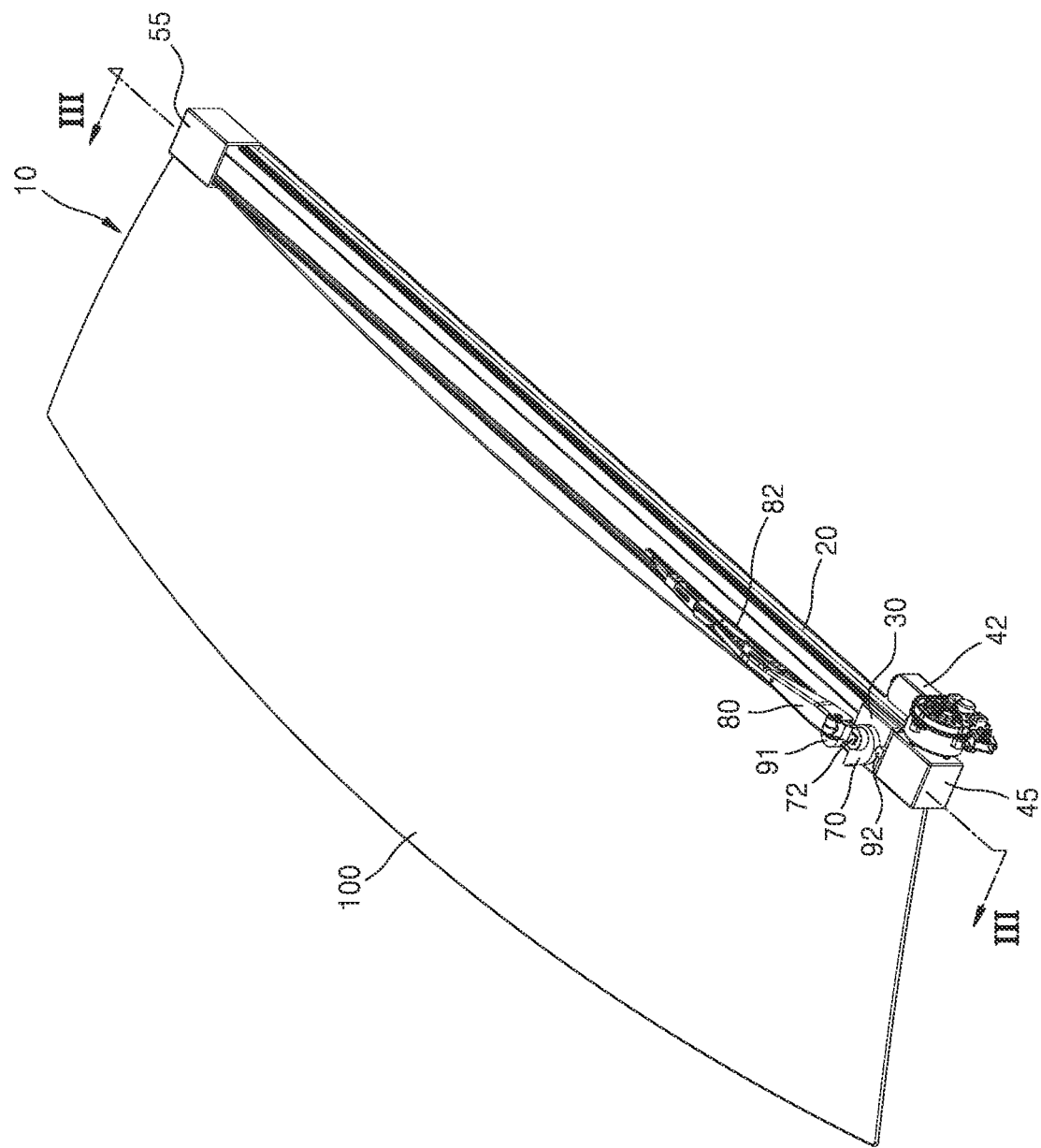
FIG. 1 is a perspective view of a wiper system according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, preferred embodiments according to the present invention will be described in more detail with reference to the accompanying drawings.

Figure 2:
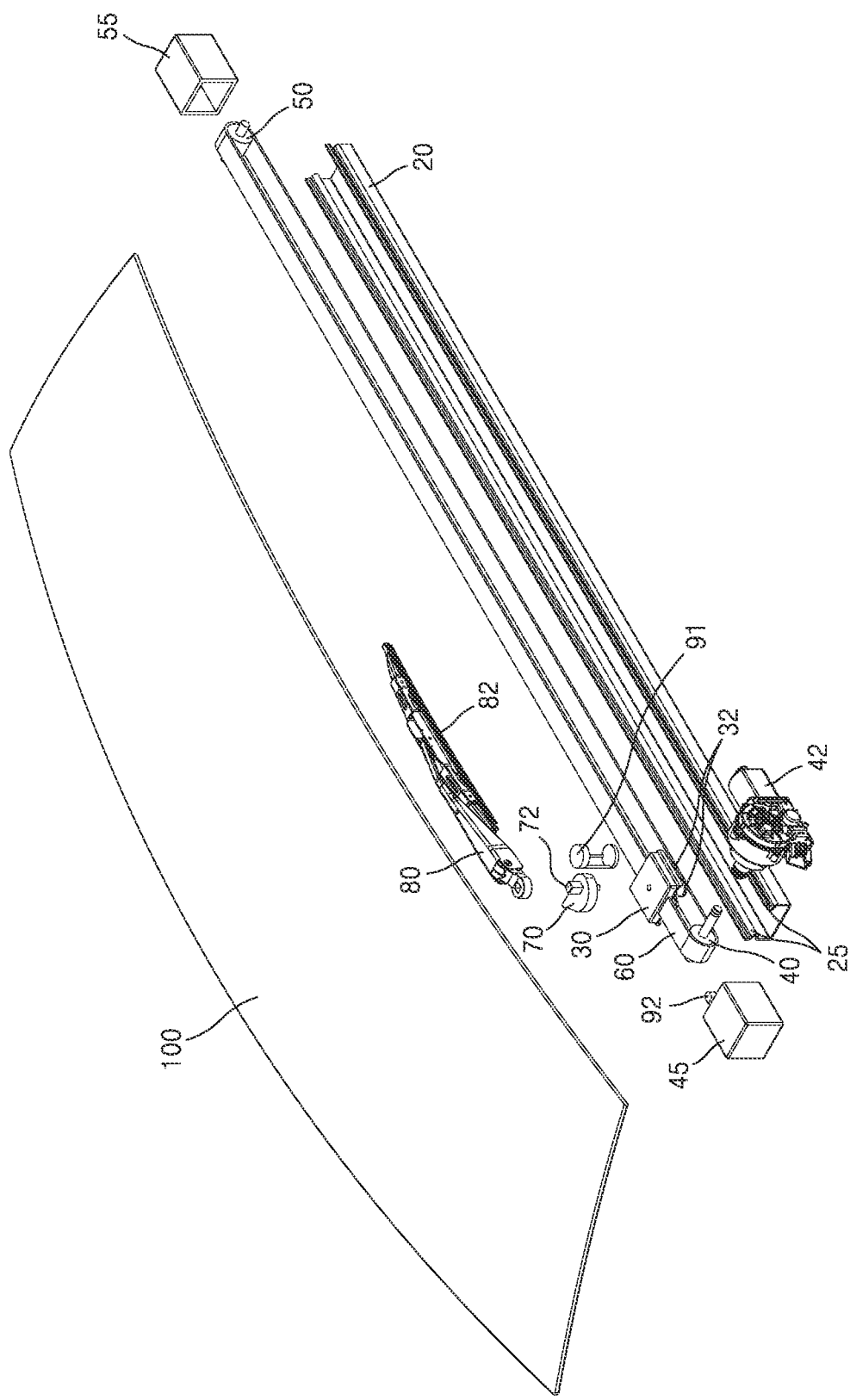
FIG. 2 is an exploded perspective view of main components of a wiper system shown in FIG. 1.
Figure 3:
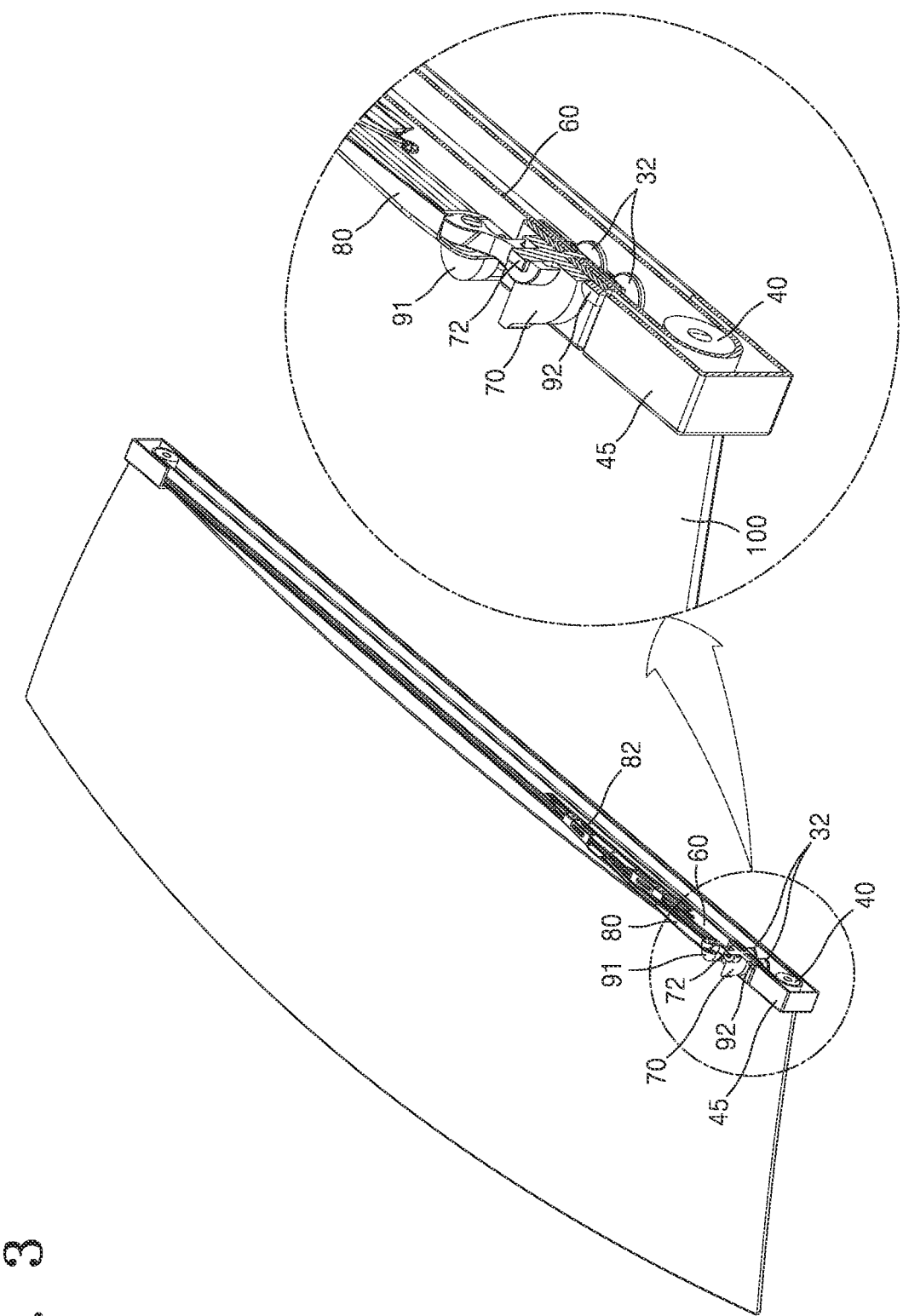
FIG. 3 is a cross-sectional view taken along line III-III shown in FIG. 1.
Figure 4:
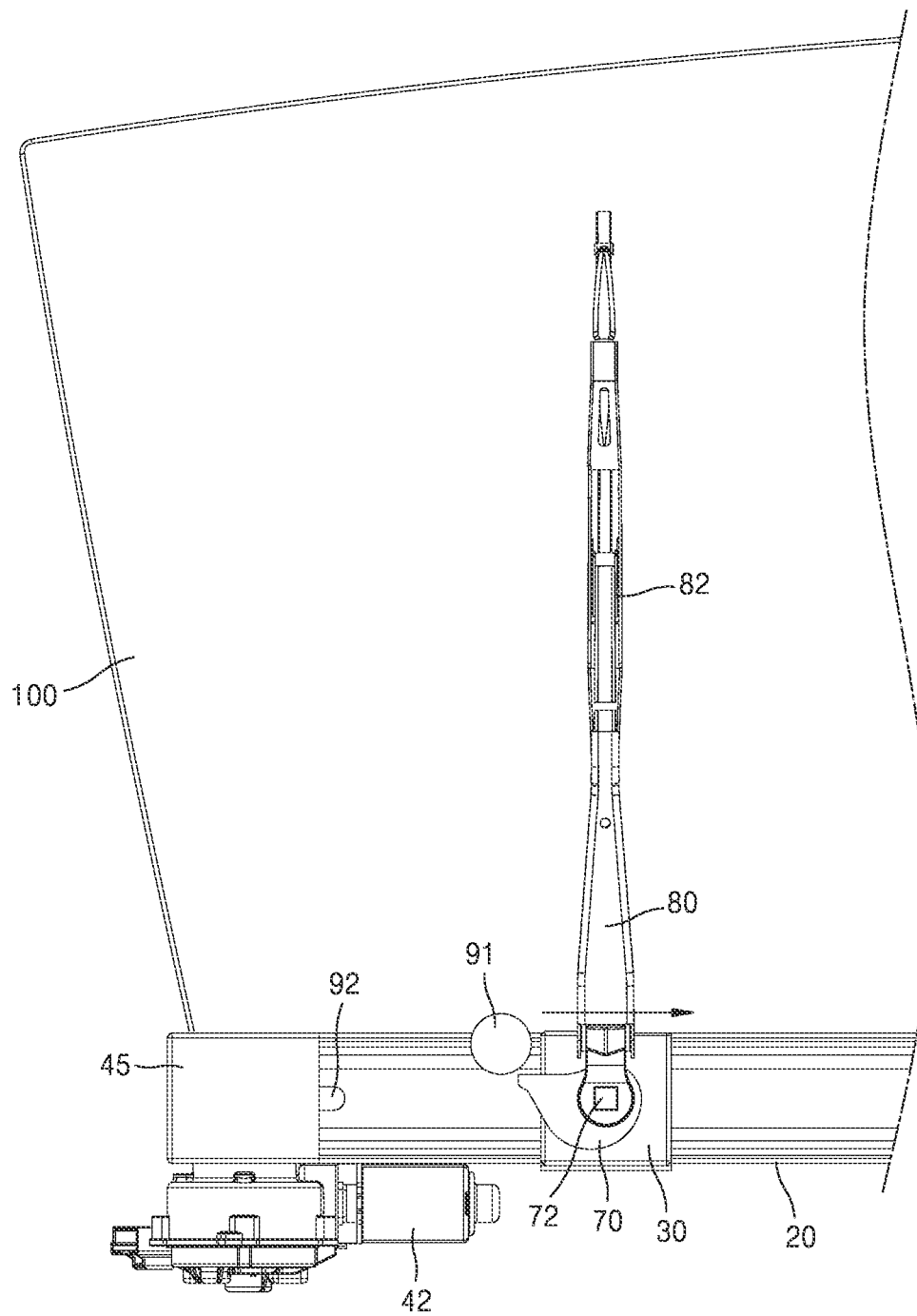
FIG. 4 is a view showing an arrangement state of a wiper arm when the wiper system shown in FIG. 1 is in a wiping operation state.
Figure 5:
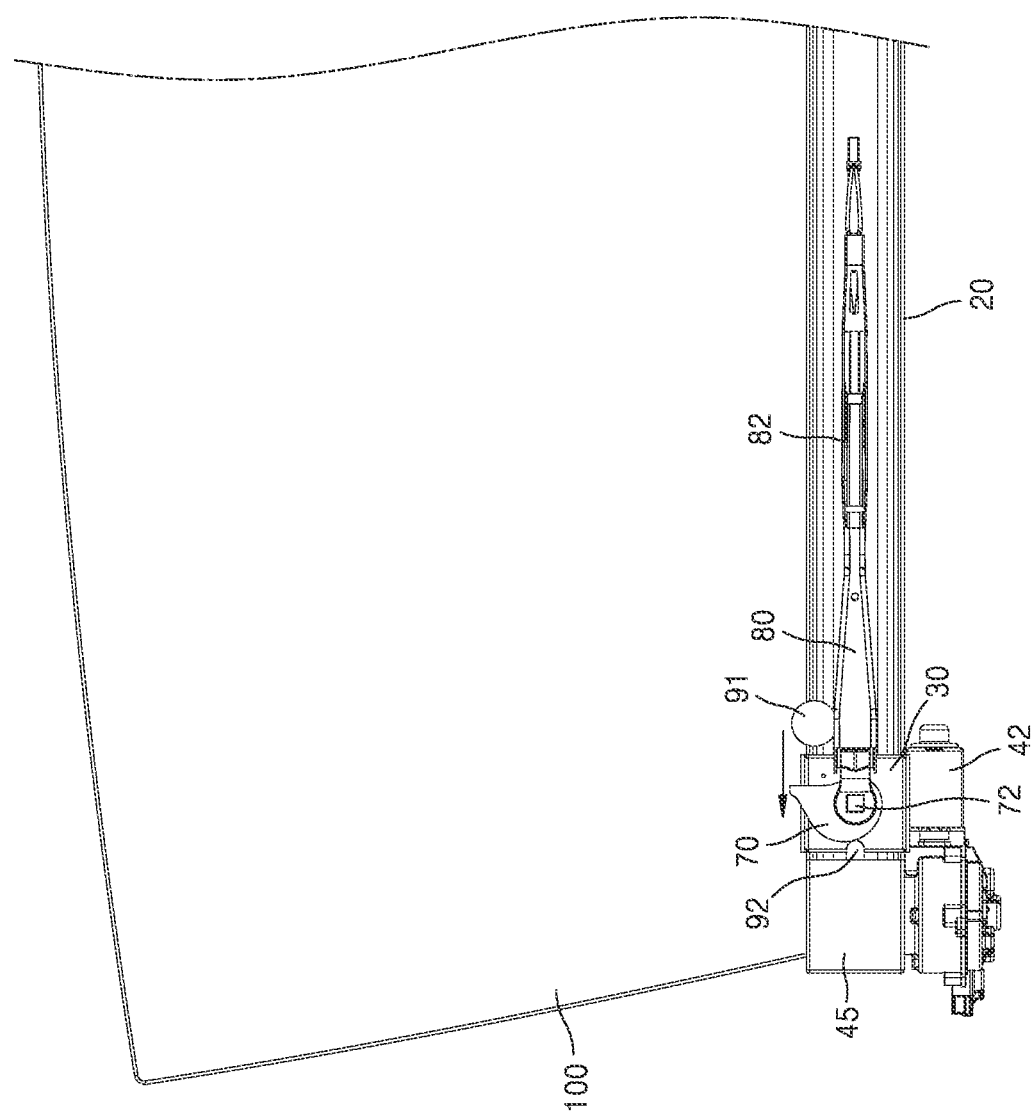
FIG. 5 is a view showing an arrangement state of a wiper arm in a parking state of the wiper system illustrated in FIG. 1.
Figure 6:
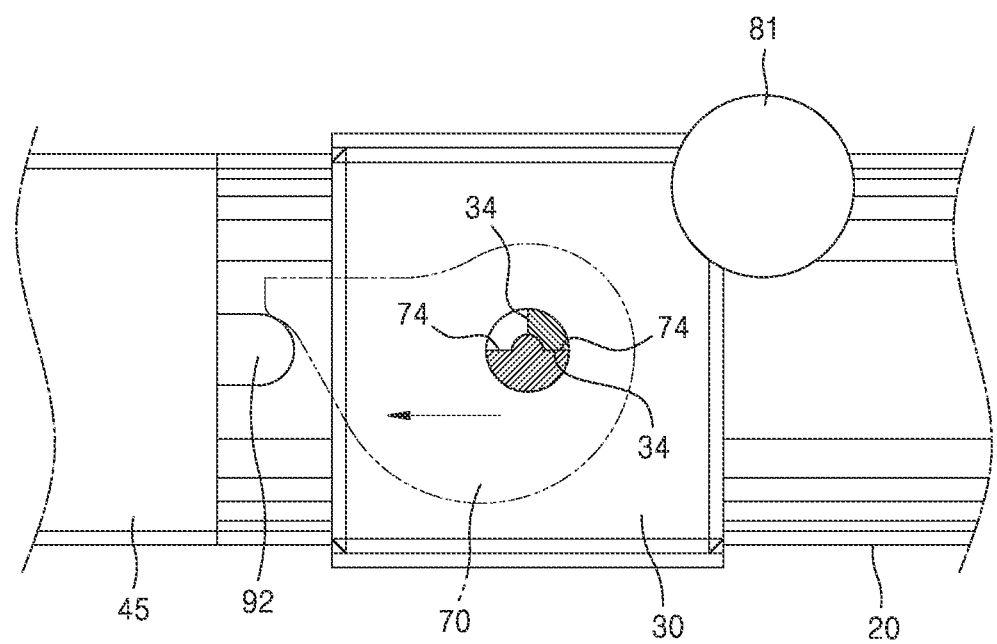
FIG. 6 is a diagram schematically showing a cam member when the cam member is switched from a wiping operation state to a parking state in a wiper system according to the present invention.
Figure 7:
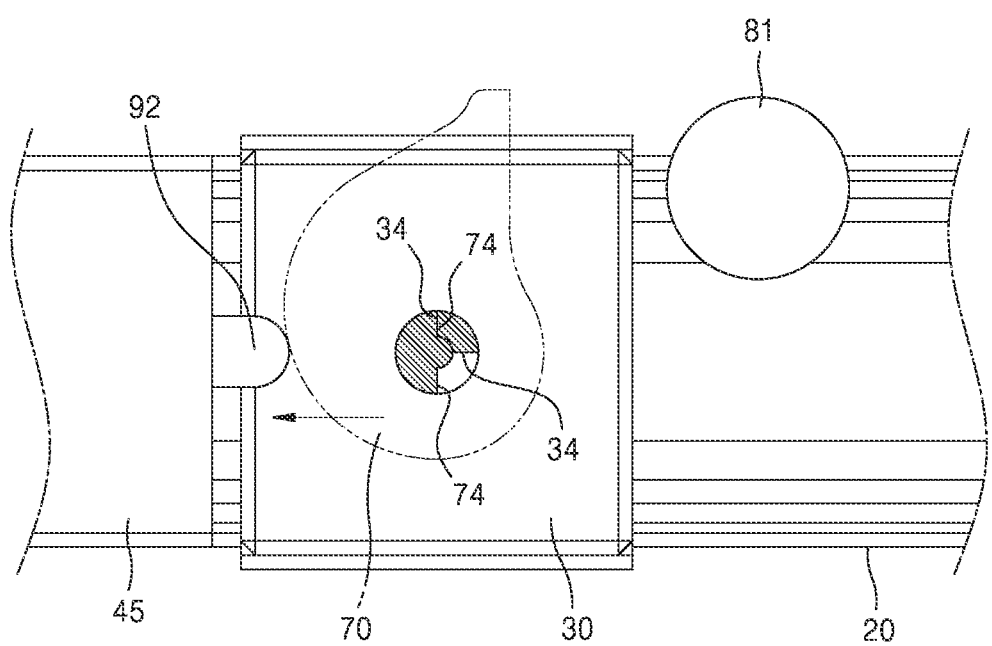
FIG. 7 is a view schematically showing the cam member after the cam member is completely converted to a parking state in a wiper system according to the present invention.
Figure 8:
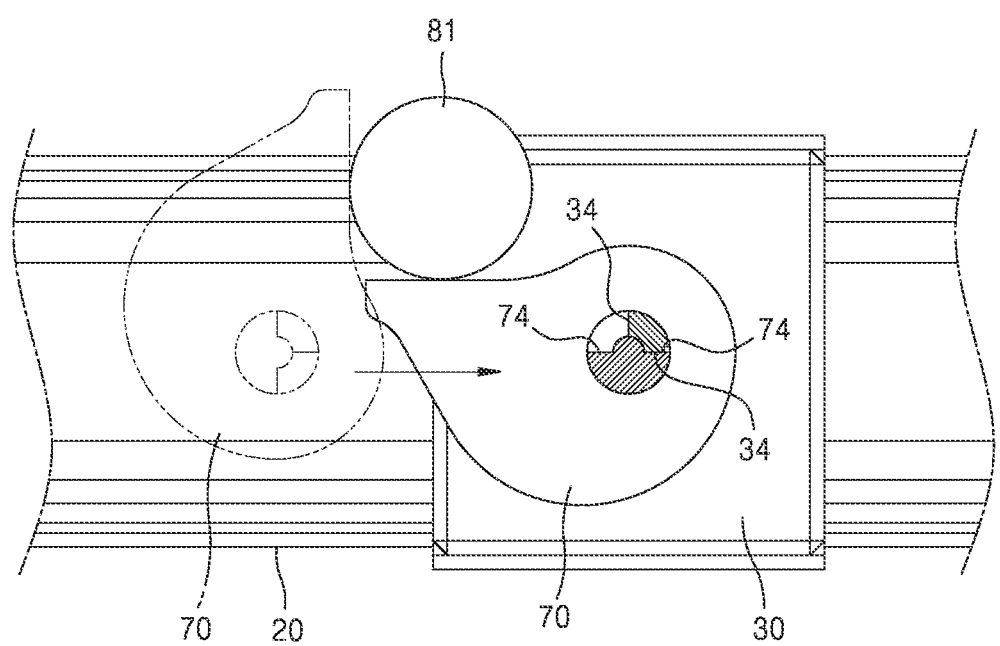
FIG. 8 is a diagram schematically showing a cam member when the cam member is switched from a parking state to a wiping operation state in the wiper system according to the present invention.
Figure 9:
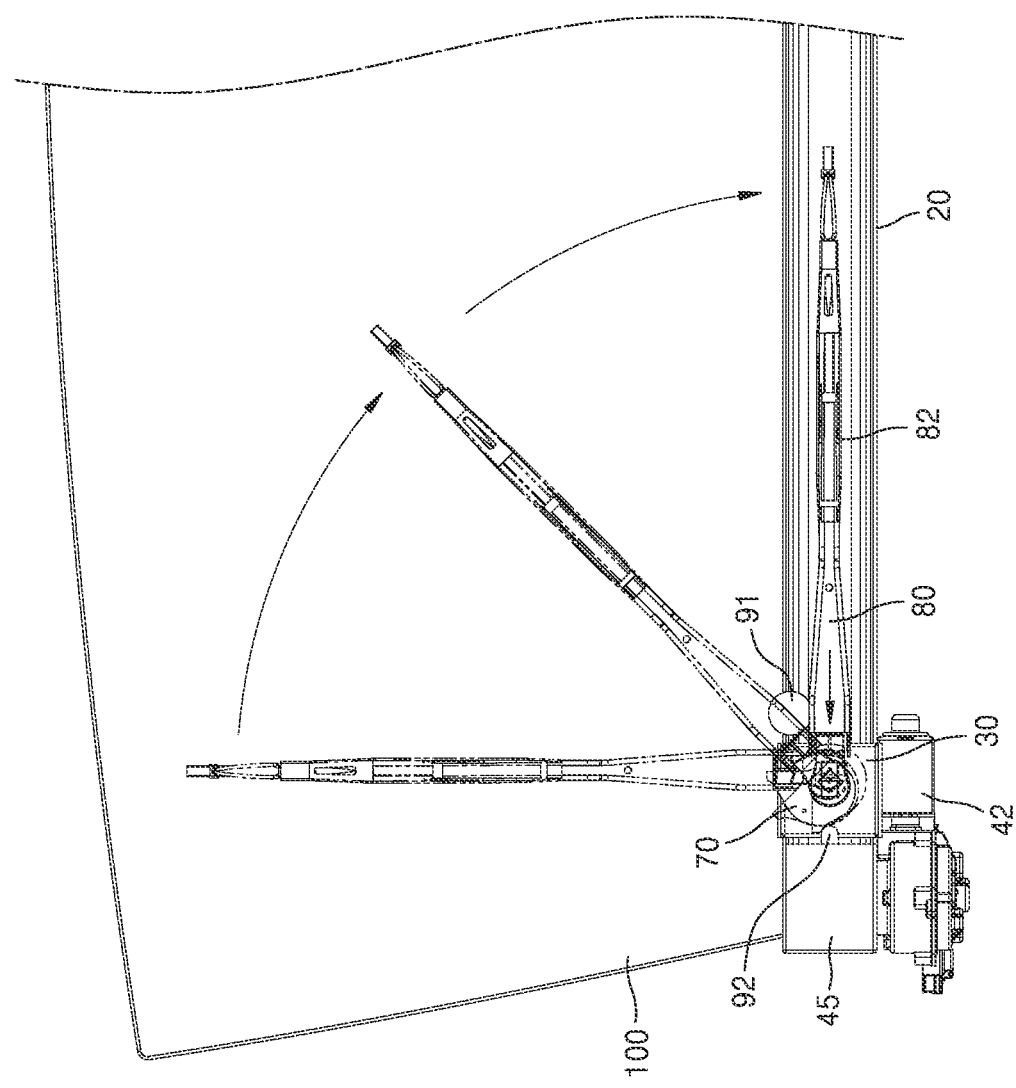
FIG. 9 is a diagram schematically showing a process of switching from a wiping operation state to a parking state in the wiper system according to the present invention.
Figure 10:
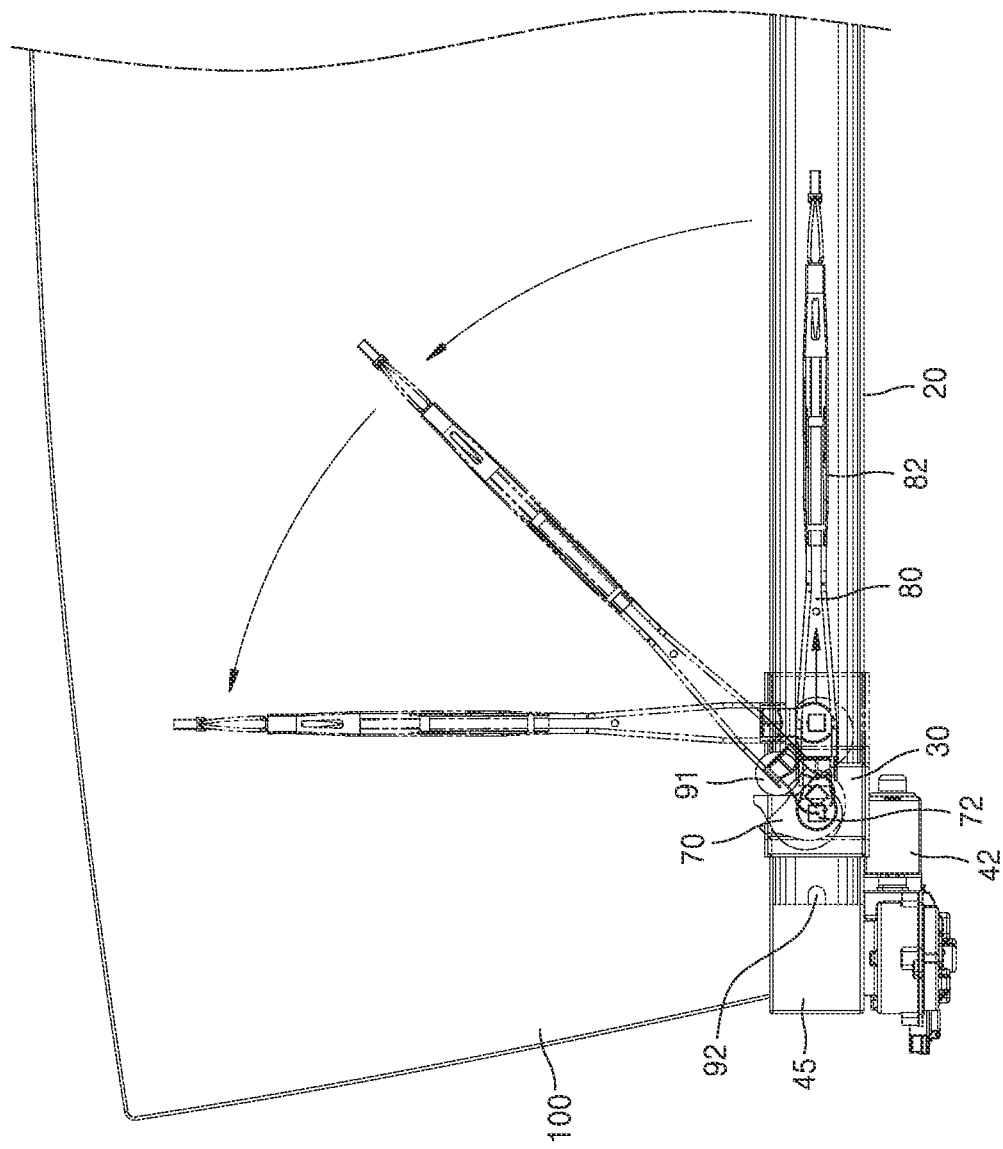
FIG. 10 is a diagram schematically showing a process of switching from a parking state to a wiping state in the wiper system according to the present invention.

FIG. 1 is a perspective view of a wiper system according to an embodiment of the present invention. FIG. 2 is an exploded perspective view of main components of a wiper system shown in FIG. 1; FIG. 3 is a cross-sectional view taken along line III-Ill shown in FIG. 1. FIG. 4 is a view showing an arrangement state of a wiper arm when the wiper system shown in FIG. 1 is in a wiping operation state. FIG. 5 is a view showing an arrangement state of a wiper arm in a parking state of the wiper system illustrated in FIG. 1. FIG. 6 is a diagram schematically showing a cam member at a moment when the cam member is switched from a wiping operation state to a parking state in a wiper system according to the present invention. FIG. 7 is a view schematically showing the cam member after the cam member is completely converted to a parking state in a wiper system according to the present invention. FIG. 8 is a diagram schematically showing a cam member when the cam member is switched from a parking state to a wiping operation state in the wiper system according to the present invention. FIG. 9 is a diagram schematically showing a process of switching from a wiping operation state to a parking state in the wiper system according to the present invention. FIG. 10 is a diagram schematically showing a process of switching from a parking state to a wiping state in the wiper system according to the present invention.

Referring to FIGS. 1 to 10, a linear reciprocating wiper system 10 (hereinafter referred to as "wiper parking system") provided with a parking structure according to a preferred embodiment of the present invention includes a guide rail 20, a carrier unit 30, a drive wheel 40, a driven wheel 50, a power transmission member 60, a cam member 70, a wiper arm 80, a first pressing member 91, and a second pressing member 92.

The guide rail 20 is a rolled product or an extruded structure extending in a linear form. That is, the guide rail 20 is, for example, a structure processed in a straight or curved form. The guide rail 20 may be installed in a direction parallel to a ground in the vehicle. In addition, the guide rail 20 may be installed long in a width direction of the vehicle. The guide rail 20 may be installed along the lower end of a window. The guide rail 20 may have a constant curvature along a longitudinal direction depending on the design shape of the vehicle. A roller guide 25 protruding inward may be provided on both side walls of the inner side of the guide rail 20. The roller guide 25 is coupled to a roller 32 to be described later so that the carrier unit 30 can move smoothly.

The carrier unit 30 is coupled to be slidable on the guide rail 20. The carrier unit 30 is installed to be reciprocated in a longitudinal direction of the guide rail 20. The carrier unit 30 includes a roller 32. A plurality of rollers 32 may be provided. In this embodiment, four rollers 32 are provided. The roller 32 is coupled to roll along a roller guide 25 provided on the guide rail 20 and rolls along the roller guide 25. The roller 32 is installed to be rotatable in the carrier unit 30.

The driving wheel 40 is installed at one end of the guide rail 20. The guide rail 20 is rotated by a drive motor 42. The driving wheel 40 may be assembled to one end of the guide rail 20 by a driving wheel cover 45. The drive wheel cover 45 may be fixed to the guide rail 20 by means such as bolts or screws. The rotation direction of the driving wheel 40 is changed by the forward or reverse rotation of a driving motor 42.

The driven wheel 50 is installed at the other end of the guide rail 20. The driven wheel 50 is installed to be rotatable on the guide rail 20. It is preferable that the rotation axis of the driving wheel 40 and the rotation axis of the driven wheel 50 are arranged to be parallel to each other.

The power transmission member 60 is connected to transmit the power of the driving wheel 40 and the driven wheel 50. The power transmission member 60 may be, for example, any one of components such as a drive belt, a wire, a chain, a ball screw, and a gear. For example, when the power transmission member 60 is a driving belt, the power transmission member 60 circulates between the driving wheel 40 and the driven wheel 50. It is preferable that the power transmission member 60 is disposed inside the guide rail 20. The power transmission member 60 is fixed to the carrier unit 30. Accordingly, as the power transmission member 60 moves in a forward or reverse direction, the carrier unit 30 moves along the guide rail 20.

The cam member 70 is installed to be rotatable on the carrier unit 30. A pivot shaft 72 to which the wiper arm 80 is coupled is provided on the cam member 70. The wiper arm 80 may be detachably installed on the pivot shaft 72 in a one-touch form. The cam member 70 changes the arrangement direction of the wiper arm 80 by contacting the first pressing member 91 and the second pressing member 92 to be described later. The cam member 70 is disposed on the carrier unit 30. The cam member 70 is disposed to be rotatable in the carrier unit 30 through a means such as a rolling bearing. The cam member 70 is installed so that it may be rotated by a rotational torque that is not rotated by a frictional force, wherein the frictional force is a force such that the blade 82 installed on the wiper arm 80 contacts the surface of the window glass 100 to remove foreign substances. That is, the cam member 70 keeps the wiper arm 80 in a vertical state with the guide rail 20 when the wiper is operated in the forward and reverse direction in the state where the wiper arm 80 is spread on the surface of the window glass 100

The wiper arm 80 is coupled to the cam member 70. The wiper arm 80 moves integrally with the cam member 70. The blade 82 is coupled to the wiper arm 80.

The first pressing member 91 is a structure that rotates the cam member 70 while the carrier unit 30 moves in the forward direction along the guide rail 20. The first pressing member 91 may be fixed to the guide rail 20 by welding or the like. The first pressing member 91 rotates the cam member 70 by using the force that the carrier unit 30 moves in the forward direction, thereby aligning the wiper arm 80 in a direction perpendicular to the guide rail 20. The first pressing member 91 acts as a structure preventing the carrier unit 30 from moving in a state in which the wiper arm 80 is parallel to the guide rail 20. Meanwhile, the first pressing member 91 acts as a structure that does not interfere with the movement of the carrier unit 30 in a state in which the wiper arm 80 is perpendicular to the guide rail 20. That is, the first pressing member 91 may interfere with the cam member 70 or eliminate interference with the cam member 70 as the cam member 70 rotates.

The second pressing member 92 is installed to rotate the cam member 70 while the carrier unit 30 moves in the reverse direction along the guide rail. The second pressing member 92 rotates the cam member 70 by using the force that the carrier unit 30 moves in the reverse direction. The second pressing member 92 aligns the wiper arm 80 in a direction parallel to the guide rail 20. The second pressing member 92 may be provided as a structure fixed to the driving wheel cover 45 or a structure integrated with the driving wheel cover 45.

As shown in FIGS. 6 to 8, the carrier unit 30 may include a rotation limiting stopper 34 that limits the rotation range of the cam member 70. The rotation limiting stopper 34 defines a maximum rotation range between the parking position and the wiping position of the cam member 70. A bumping portion 74 that collides with the rotation limiting stopper 34 may be provided on the rotation shaft of the cam member 70.

The operating effect of the wiper system 10 including the above-described components will be described in detail by taking the operation process of the wiper as an example.

First, a process of switching the wiper from a wiping position to a parking position will be described.

A process of converting from the operating state of the wiper shown in FIG. 4 to the parking state of the wiper shown in FIG. 5 will be described.

In the state as shown in FIG. 4, the driving wheel 40 moves the power transmission member 60 by reverse rotation of the driving motor 42 to move the carrier unit 30 in a direction closer to the driving wheel 40. The carrier unit 30 moves to the left without interference with the first pressing member 91 in FIG. 4. The carrier unit 30 moves to the left so that the most protruding portion of the cam member 70 contacts the second pressing member 92. As the carrier unit 30 continues to move to the left, the cam member 70 rotates clockwise as shown in FIG. 9 by the second pressing member 92. When the cam member 70 is rotated by 90° in the clockwise direction, the wiper arm 80 is aligned in a direction parallel to the guide rail 20. In addition, the bumping portion 74 of the cam member 70 is blocked by the rotation limiting stopper 34 provided in the carrier unit 30 so that the cam member 70 may not rotate any more. Through this process, the wiper system according to the present invention is completely switched to the parking state. In the parking state, the wiper arm 80 is separated from the window glass 100 and aligned in a direction parallel to the guide rail 20, thereby providing effects that the possibility that the wiper arm 80 is unexpectedly damaged by equipment such as an automatic car wash is reduced, beautiful appearance is provided, and the wiper does not interfere with the driver's view when driving.

Now, a process of converting from the parking state illustrated in FIG. 5 to the operating state of the wiper illustrated in FIG. 4 will be described.

In the state as shown in FIG. 5, the driving wheel 40 moves the power transmission member 60 by the forward rotation of the driving motor 42 to move the carrier unit 30 in a direction away from the driving wheel 40. As the carrier unit 30 moves to the right from the state shown in FIG. 5, the cam member 70 is spaced apart from the second pressing member 92 and gradually moves away. Subsequently, the carrier unit 30 moves to the right so that the cam member 70 contacts the first pressing member 91. As the carrier unit 30 continues to move to the right, the cam member 70 rotates in a counterclockwise direction as shown in FIG. 10 by the first pressing member 91. The wiper arm 80 is aligned in a direction perpendicular to the guide rail 20 while the cam member 70 is rotated by 90° in the counterclockwise direction. In addition, the bumping portion 74 of the cam member 70 is blocked by the rotation limiting stopper 34 provided in the carrier unit 30 so that the bumping portion 74 does not rotate any more. Through this process, the wiper system according to the present invention is completely switched to the wiper operation state. In the wiper system, the carrier unit 30 performs a reciprocating linear motion while the wiper is operating, thereby effectively removing foreign matter from the window glass 100.

As described above, the linear reciprocating wiper system provided with the parking structure according to the present invention is configured such that the wiper arm is rotated in the linear movement direction of the wiper in the parked state, so that the linear reciprocating wiper system provides the effect that the wiper does not interfere with the driver's view, the durability thereof is improved as damage is prevented by unexpected impacts, and the appearance is beautiful.

In addition, the wiper system according to the present invention may secure a wipe area capable of effectively removing foreign substances from the window glass by maintaining the wiper arm perpendicular to the guide rail in the wiper operation state.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A linear reciprocating wiper system provided with a parking structure, the linear reciprocating wiper system comprising:
    a guide rail;
    a carrier unit coupled to be slidable in the guide rail and installed to reciprocate in a longitudinal direction of the guide rail;
    a cam member installed to be rotatable on the carrier unit and provided with a pivot shaft;
    a wiper arm coupled to the pivot shaft of the cam member to move integrally with the cam member and to which a blade is coupled;

a first pressing member for aligning the wiper arm in a direction perpendicular to the guide rail by rotating the cam member while the carrier unit is moving in a forward direction along the guide rail, wherein the first pressing member is fixed to the guide rail; and a second pressing member for aligning the wiper arm in a direction parallel to the guide rail by rotating the cam member while the carrier unit is moving in a reverse direction along the guide rail, wherein the second pressing member is fixed to a driving wheel cover fixed to the guide rail.

2. The linear reciprocating wiper system of claim 1, further comprising:

a driving wheel installed at one end of the guide rail and rotated by a driving motor;

a driven wheel installed at the other end of the guide rail; and a power transmission member connected to the drive wheel and the driven wheel and fixed to the carrier unit.

3. The linear reciprocating wiper system of claim 1, wherein the carrier unit includes a plurality of rollers, and the plurality of rollers are configured to move along a roller guide formed on both side walls of the guide rail.

4. The linear reciprocating wiper system of claim 1, wherein the carrier unit is provided with a rotation limiting stopper for limiting a rotation range of the cam member.

\* \* \* \* \*